United States Patent [19]

Nicklaus

[11] 4,417,497
[45] Nov. 29, 1983

[54] STRINGED MUSICAL INSTRUMENT TEACHING DEVICE AND PROCESS

[76] Inventor: Helen C. Nicklaus, 4308 Charles, Amarillo, Tex. 79106

[21] Appl. No.: 252,973
[22] PCT Filed: May 29, 1980
[86] PCT No.: PCT/US80/00647
§ 371 Date: Jun. 9, 1980
§ 102(e) Date: Jun. 9, 1980

[51] Int. Cl.³ .............................................. G09B 15/08
[52] U.S. Cl. ................................... 84/485 R; 84/476
[58] Field of Search ................... 84/453, 314 R, 465, 84/470 R, 471 R, 472, 476, 485 R

[56] References Cited

U.S. PATENT DOCUMENTS

| | | | |
|---|---|---|---|
| 1,821,516 | 9/1931 | Hohn | 84/485 R |
| 1,879,002 | 9/1932 | Alles | 84/472 |
| 3,403,590 | 10/1968 | Quinton | 84/470 R |

FOREIGN PATENT DOCUMENTS

| | | | |
|---|---|---|---|
| 2651019 | 5/1978 | Fed. Rep. of Germany | 84/471 R |
| 21402 | of 1891 | United Kingdom | 84/485 R |

*Primary Examiner*—Lawrence R. Franklin
*Attorney, Agent, or Firm*—Ely Silverman

[57] ABSTRACT

A teaching device for stringed musical instruments used by a player thereof to identify, practice and make changes between notes of scales of different keys. It is constructed of a simulated fingerboard comprising a rigid support surface (56) with magnetic guide members (51-54) therein and a set of structurally like note index units (as 101-128) each of such units comprising an upper label bearing panel (81) and a lower support and attaching magnetic element (83) and each of such units being removably yet stably locatable on the fingerboard. The apparatus components are organized to correspond with written music notation and operate to provide (a) a visual and tactile guide for proper finger positioning on the fingerboard, (b) finger positioning practice and (c) visual signal when finger positions are improper, and (d) facilitate removing, displacing and positioning of such units to indicate proper finger positioning for operating in different keys.

10 Claims, 28 Drawing Figures

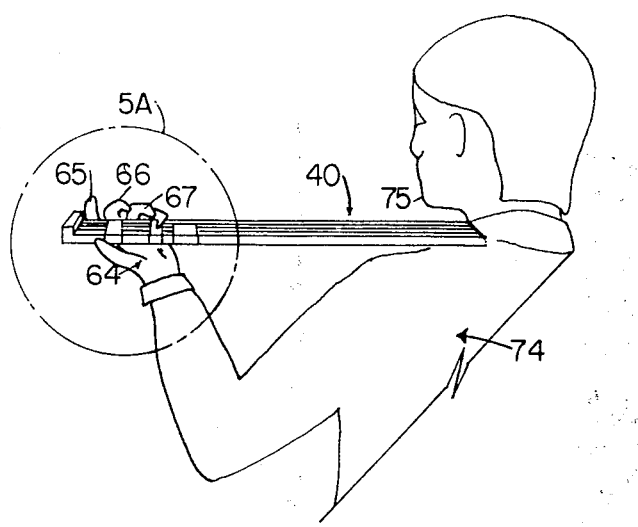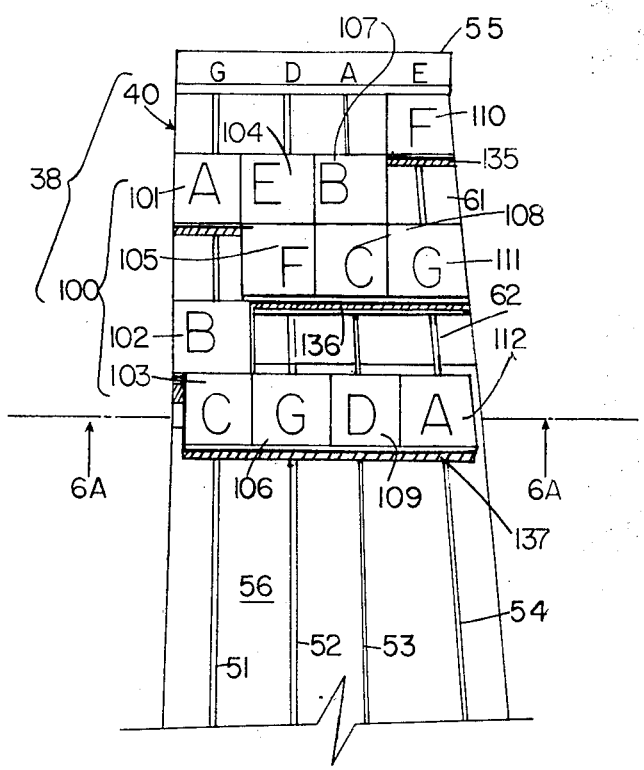

FIG.11, FIG.12, FIG.13, FIG.14

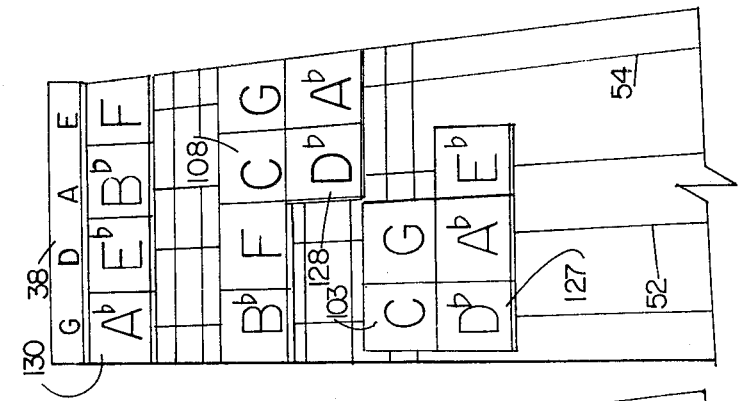
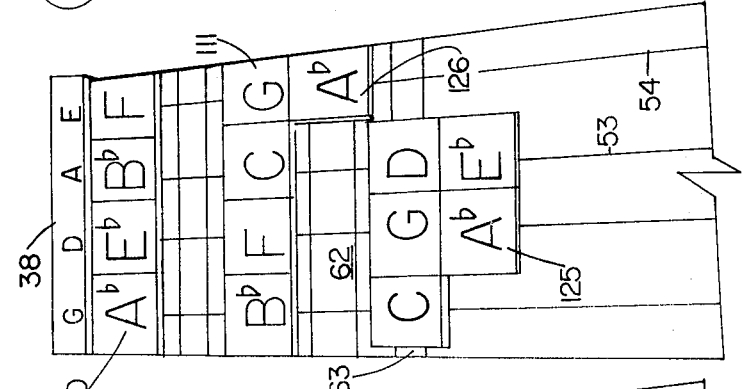
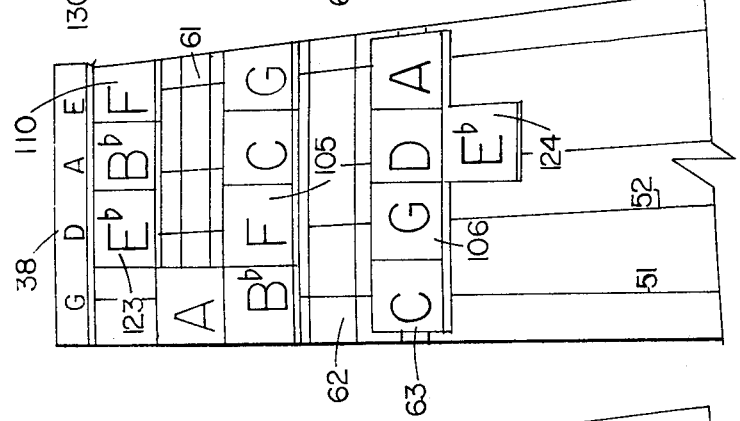
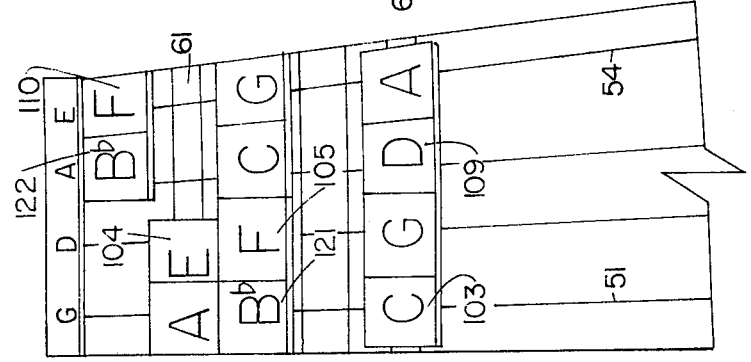

STRINGED MUSICAL INSTRUMENT TEACHING DEVICE AND PROCESS

DESCRIPTION

1. Technical Field

This invention relates to stringed musical instruments and apparatus for teaching a student to apply conventional visual written notations provided for music representation to finger positioning on stringed instruments.

2. Background Art

Music teaching devices as in U.S. Pat. Nos. 294,139 and 979,193 and 1,754,459 provide methods and apparatus for teaching harmony and relations of notes while texts as "Techniques and Materials of Tonal Music" by T. Benjamin, M. Horvit and R. Nelson published by Houghton Mifflin Company, Boston, U.S.A. provide explanations of theory; it is left to the student and teacher to relate such theory and visual illustrations to the practice and operation of stringed instruments especially to practice changes of key.

DISCLOSURE OF INVENTION

The apparatus of this invention comprises a simulated fingerboard and a set of movable note index units that are cooperatively and concurrently used to visually illustrate and practice the proper location of finger positions for each of the notes in each of several keys of operation of a stringed instrument. It also provides an apparatus and method of visually illustrating the sequence of changes of finger positions—shown by the movable note index units—between the various keys and note sequences. The apparatus provides for firmly yet releasably holding, longitudinally displacing and replacing note index units with one hand of the student while the other hand of the student holds the simulated fingerboard of a stringed instrument in normal operating position of that stringed instrument.

The apparatus of the invention provides an intermediate stage in the transfer of visual perception of musical notes as illustrated on conventional sheet music or text by a student of a stringed instrument to the step of physical learning and/or kinesthetic recognition and practice of placement of fingers on a fingerboard of a string instrument and of change or movement of finger positions for playing a stringed instrument such as a violin and for operating in different keys.

BRIEF DESCRIPTION OF DRAWINGS

FIG. 4 is a perspective view of a student or player using the simulated fingerboard of this invention.

FIG. 5 is a top oblique view of zone 5A of FIG. 4 showing the zone of the simulated fingerboard with note indicia located thereon for the key of C major position as seen by the eyes of the student of FIG. 4.

Figures 11, 12, 13, 14:
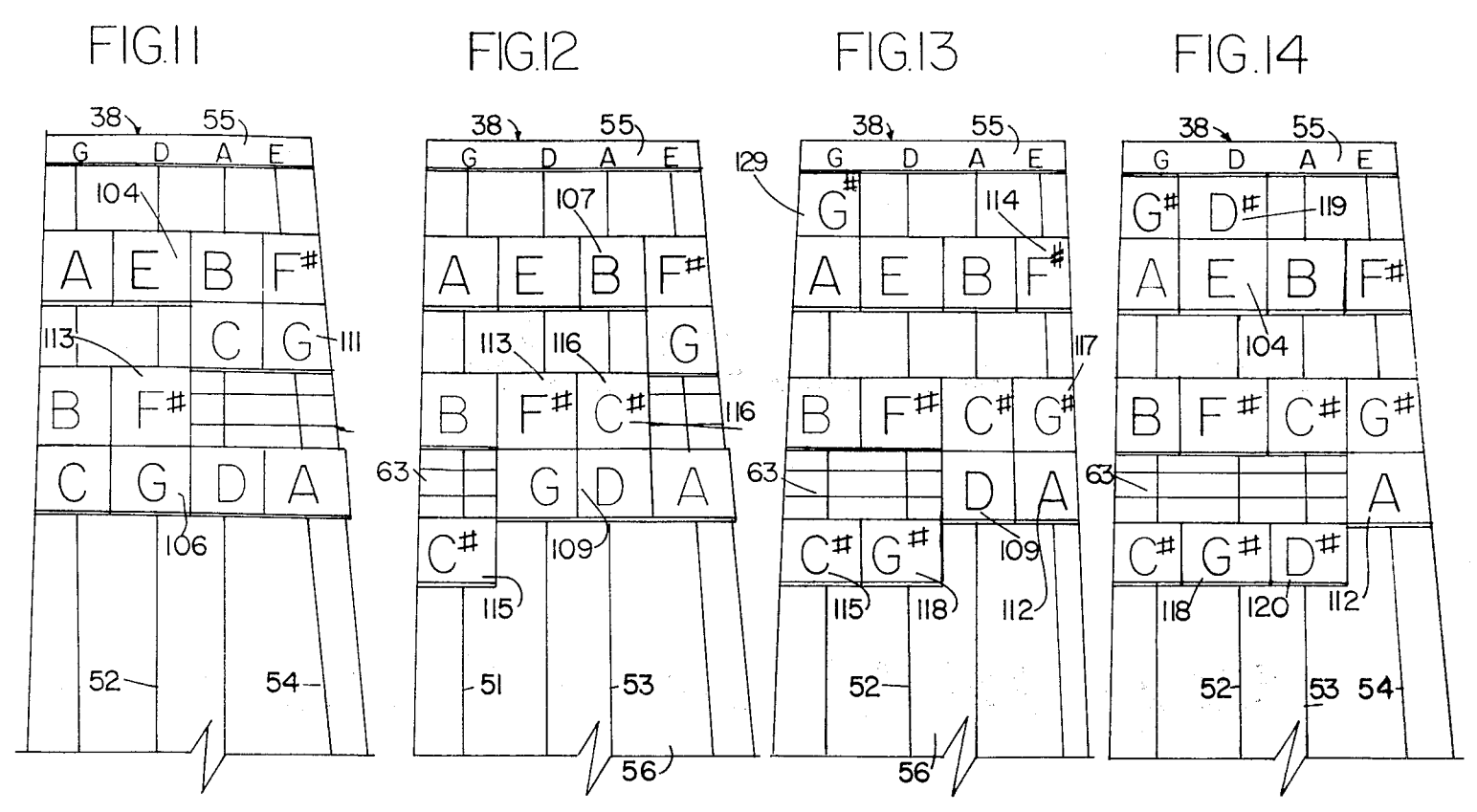

FIG. 11 shows the location of the note index units of apparatus 38 when those note index unit illustrate the finger positions for the key of G major on the simulated fingerboard.

FIG. 12 shows the location of the note index units of apparatus 38 when those note index unit illustrate the finger positions for the key of D major on the simulated fingerboard.

FIG. 13 shows the location of the note index units of apparatus 38 when those note index unit illustrate the finger positions for the key of A major on the simulated fingerboard.

FIG. 14 shows the location of the note index units of apparatus 38 when those note index unit illustrate the finger positions for the key of E major on the simulated fingerboard.

FIG. 15 shows the location of the note index units of apparatus 38 when those note index unit illustrate the finger positions for the key of F major on the simulated fingerboard.

FIG. 16 shows the location of the note index units of apparatus 38 when those note index unit illustrate the finger positions for the key of B flat major on the simulated fingerboard.

FIG. 17 shows the location of the note index units of apparatus 38 when those note index unit illustrate the finger positions for the key of E flat major on the simulated fingerboard.

FIG. 18 shows the location of the note index units of apparatus 38 when those note index unit illustrate the finger positions for the key of A flat major on the simulated fingerboard.

FIG. 19 is a diagrammatic showing of the circle of fifths showing the relations of major (in capital letters) and minor (in lower case) keys and, also the relations thereof to (a) the FIGS. 20-28 herein (indicated by underlined numbers) which

FIG. 21 is a conventional showing of the written key of G major signature and scale and the steps between notes shown in FIG. 11.

FIG. 22 is a conventional showing of the key of D major signature and scale and the steps between notes shown in FIG. 12.

FIG. 23 is a conventional showing of the key of A major signature and scale and the steps between notes shown in FIG. 13.

FIG. 24 is a conventional showing of the key of E major signature and scale and the steps between notes shown in FIG. 14.

FIG. 25 is a conventional showing of the key of F major signature and scale and the steps between notes shown in FIG. 15.

FIG. 26 is a conventional showing of the key of B flat signature and scale and the steps between notes shown in FIG. 16.

FIG. 27 is a conventional showing of the key of E flat signature and scale and the steps between notes shown in FIG. 17.

FIG. 28 is a conventional showing of the key of A flat signature and scale and the steps between notes shown in FIG. 18. In FIGS. 21-28 the sharp and flat are shown above the notes rather than to the side for purpose of clarity of bracket relations therein.

BEST MODE FOR CARRYING OUT THE INVENTION

Figures 1, 2, 3:
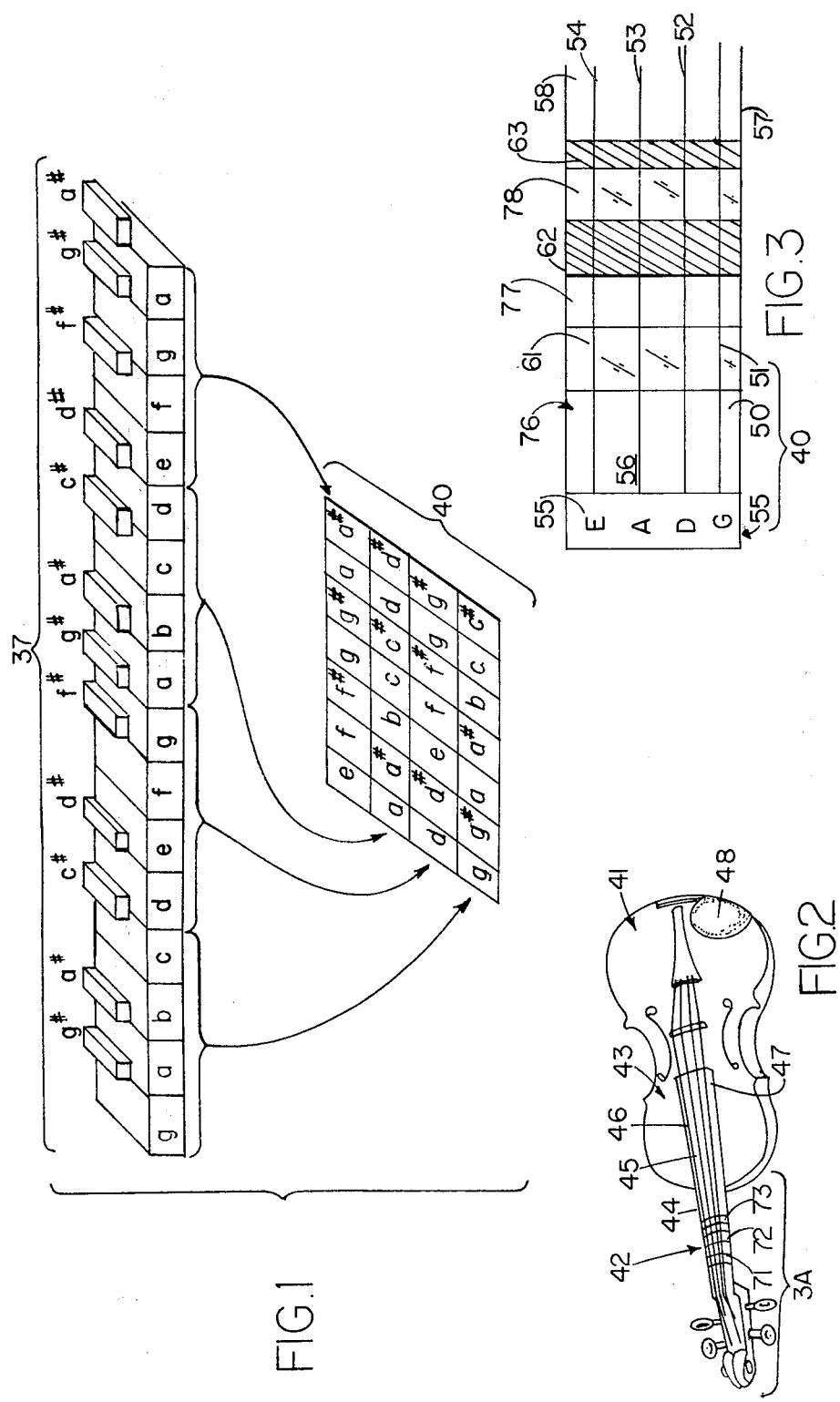
FIG. 1 is a set of connected sketches diagrammatically showing the relations of the musical tones of the musical scale on a portion of a piano keyboard with the musical tones on the fingerboard of a violin.
FIG. 2 is a perspective scale view of the locations of teaching tapes for finger positions on the fingerboard of a violin and showing other structures on such violin.
FIG. 3 is an enlarged diagrammatic view of zone 3A of FIG. 2 showing the positions of the teaching tapes on the simulated fingerboard forming a part of the apparatus of this invention.

The apparatus 38 comprises a simulated fingerboard 40 and a set, 100, of like note index units. The simulated fingerboard 40 comprises a rigid flat wood base 50 of rectangular cross section and a series of straight parallel magnetically permeable continuous wires 51-54 and a head 55. In the preferred embodiment the wires 51-54 each have an upper surface that is flush or level with the flat top surface 56 of base 50.

The base 50 is a strip of wood in which are located the series of parallel recessed wires 51-54. Each such recessed wire 51-54 is only partially sunk in the body of the fingerboard and represents one of the four strings 44-47 of a violin as 41 or other stringed instrument. Each such wire 51-54 on the fingerboard base 50 is indicated or labeled such as by the letters G, D, A and E respectively on the head 55. The letters describe the open tone pitch of the strings 47-44 respectively on the stringed musical instrument as 41 simulated by the wires 51-54 of the simulated fingerboard 40. In the preferred embodiment 38 the base 50 is 18 inches (45.72 cm) long, 3 inches (7.62 cm) wide, ¼ inch (0.635 cm) thick and has a head 55 which is ½ inch (1.27 cm) by ½ inch (1.27 cm) by 3 inches (7.62 cm) and bears lettered titles for the wires as 51-54, respectively, adjacent to such letters. The wires 51-54 are made of magnetically permeable metal such as iron or steel and extend for about 18 inches (45.72 cm) which is a length as from the normal nut or end of the fingerboard to the chin rest as 48 of a violin as 41. The wires 51-54 are each No. 18 gauge (1.5 mm diameter). The center of wire 51 is located ⅜ inch (0.953 cm) from the left edge 57 of the base 50, center of wire 54 is located ⅜ inch (0.953 cm) from the right edge 58 of the base 50, center of wire 52 is one and one-eighth inch (1⅛ in. or 2.86 cm) from the left edge of base 50, and center of 53 is one and one-eighth inch (1⅛ in. or 2.86 cm) from the right edge 58 of base 50. The wires 51-54 are located at a center-to-center distance from each other equal or slightly less than the width of the note index units and are dark in color to contrast with the light surface color of surface 56.

Colored and smooth-surfaced plastic tape or stripes 61, 62 and 63, each three-fourths of an inch (1.91 cm) wide, are placed across and are affixed permanently to the top surface 56 of the board base 50 in positions to indicate the finger placement for beginning violin students. The thickness of the tapes 61-63 is 0.005 inch (0.013 cm) or the stripe may be painted and neither tape or stripe interferes with the force between wires as 51-54 and note index units as 101-130. Colored stripes as 71, 72 and 73 corresponding in relative position and function to the colored stripes 61, 62 and 63 on the simulated fingerboard are located on the true fingerboard 42 of the actual violin instrument 41 to assist in locating finger positions on the true or actual fingerboard 42 for operating on or playing the actual stringed instrument or violin as 41.

Figure 6:
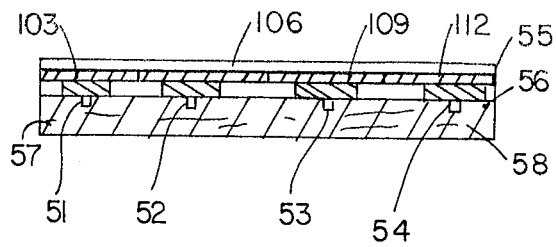
FIG. 6 is a vertical transverse section view along the plane 6A—6A of FIG. 5.
Figure 7:
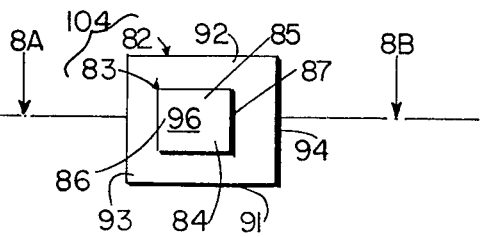
FIG. 7 is a bottom view of one of the note index units 104, of a set, 100 of structurally similar units.

The wires 51-54 are all colored black to distinguish from the white coloring of the board surface 56 and from the red coloring of all of the stripes 61-63. The stripes 61-63 are all the same red color to visually distinguish from the white color of the top surface 56 of the board 50 and from the black color of the wires 51-54. The stripes 61-63 are interrupted at the recesses 151-154 in top surface 56 in which recesses the wires 51-54 respectively are located, to directly expose the upper surfaces of each of the wires 51-54 to the bottom surfaces as 96 of the note index unit magnetic prism thereabove as shown in the position of parts shown in FIGS. 5 and 6.

Each of the note index units as 104 comprises an upper rigid thin rectangular panel 82 and a lower magnetic base or prism 83 firmly joined to each other. The width of the panels is less than the spacing between adjacent wires on the fingerboard 41. The magnetic base 83 has a width between left prism edge 84 and right prism edge 85 and a length between rear prism edge 86 and front prism edge 87 less than the width between left panel edge 91 and right panel edge 92 and less than length between rear panel edge 93 and front panel edge 94 of the panel 82 respectively and there is a front overhang portion 88 and a rear overhang panel portion 89 extending beyond the front and rear of each unit as 104. The upper face 81 of each of the panels as 82 bears an indicia of a musical note, such as a letter (A, B, C, D or E) and some also bear an indicator of sharp (#) or flat (♭).

Each magnetic prism as 83 is a permanent magnet and is firmly affixed to the bottom of a panel as 82: prism 83 has a flat bottom surface 96 that is parallel to the top surface of panel 82.

Figure 8:
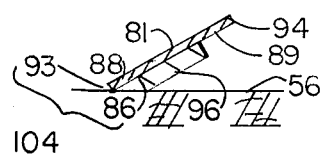
FIG. 8 is a vertical longitudinal sectional view of index unit 104 along a plane as plane 8A-8B of FIG. 7 in the position of the index unit shown in FIG. 9.

Note index units labeled A, B, and C, E, F, and G are used for the lower octave beginning with the note indicated by the simulated open string G (wire 51) and note index units labeled B, C, D, F, G, and A are used for the upper octave starting with the note indicated by the simulated open string A (wire 53) other note index units are also used labeled with musical tone notation comprising letters and symbols as F#, C#, G#, and D# as shown for units 113-121 and 129 for notes F, C, G and D sharps respectively and other note index units are provided labeled with musical tone notation comprising letters and symbols as A♭, B♭, D♭, E♭, for each of notes as B, E, A and D flat, as 122-128 and 130. In the preferred embodiment the top surface of each of the index unit panels is colored bright yellow to distinguish them from the color of the wires 51-54 and from the colors of the surfaces of the board 56 and stripes 61-63. The color of the letters and symbols for sharps and flat are dark black to distinguish clearly from the yellow color of the top surface of the panels of the note index units. The color of the panels could be bright green and other colors could be used to provide the same distinctions provided by the particular colors used in the embodiment described between wires, stripes, board surface and the simulated fingerboard top surface 56 and between those components and the top surfaces of the panels of the note index units and between such panel top surfaces and the musical notation symbols. On the usual instrument as 41, the true fingerboard top surface is usually black and the stripes 71–73 thereon are yellow and the strings appear white; such colors may also be used on corresponding parts of the apparatus 38, with changes in colors of the index unit panel surfaces (e.g. green) and symbol notation (black or yellow) to provide visual distinction and contrast as in the particular embodiment above described. Each of the panels as 82 is three-quarter inch (1.91 cm) wide and one inch (2.54 cm) tall and 0.030 in (0.075 cm) thick. The strip magnet is five-eighths inch (1.59 cm) long and one-half inch (1.25 cm) wide and 1/16 inch (0.16 cm) thick. The length of rear overhang 88 is from one-eighth to three-sixteenths inch (0.32 to 0.48 cm). Such structure of the index units accordingly provides that finger pressure on the rear edge of a unit as 104 as shown in FIG. 9 tilts the unit as shown in FIG. 8 and allows another finger of the player to be located, as in FIG. 10, under a front panel edge as 94 to readily lift hold and replace the unit 104 by another unit or to displace the same unit from one incorrect position to a correct position for such panel or otherwise manipulate it.

The simulated fingerboard 40 represents the actual fingerboard as 42 of a stringed instrument as a violin as 41. In operation of the apparatus 38, as by a player 74, the player's left hand 64 holds the simulated fingerboard 42 and fingers the instrument strings as 44–47 and a bow is held in the player's right hand; the highest pitch string 44 is to the right, viewing violin 41 from its box 43 and the lowest pitch string 47 to the left. The strings 44–47 are stretched over the true or actual fingerboard 42 and are pressed against the fingerboard by the fingers of a player to produce a variety of pitches on the stroking of each such string depending upon the position at which the fingers as 65, 66 and 67 of the player holds such string against the fingerboard 42 while the body 43 of the instrument is firmly held as under the chin of a player at a chinrest 48.

Figure 20:
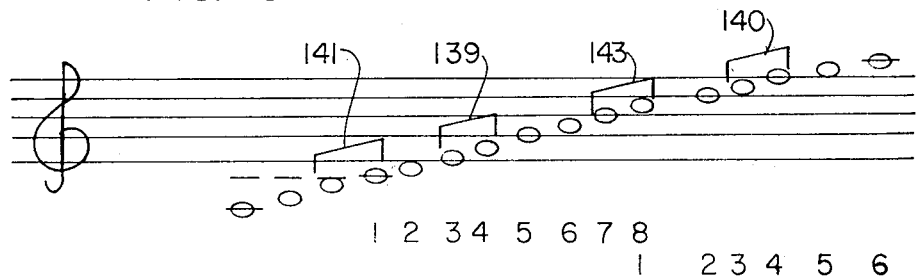
FIG. 20 is a showing of conventional staff notation for the key of C major signature and scale and the steps between notes shown in FIG. 5.
Figure 21:
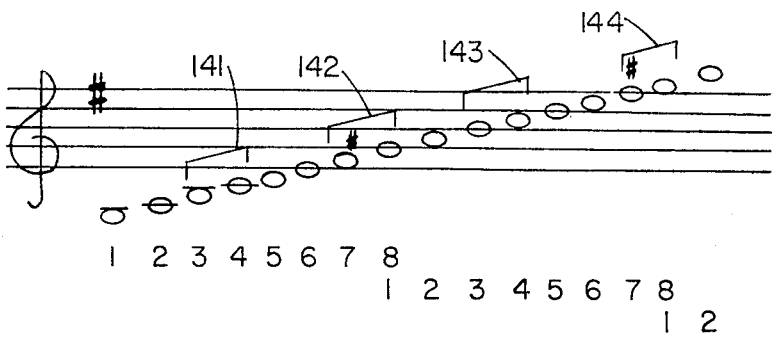
FIGS. 21-28 show the notes as shown by scales and signatures and (b) the figures herein (indicated by the bracketed figures) which figures (5 and 11-18) show scales and finger positions on the simulated fingerboard apparatus 38 for such scales and signatures.
Figure 22:
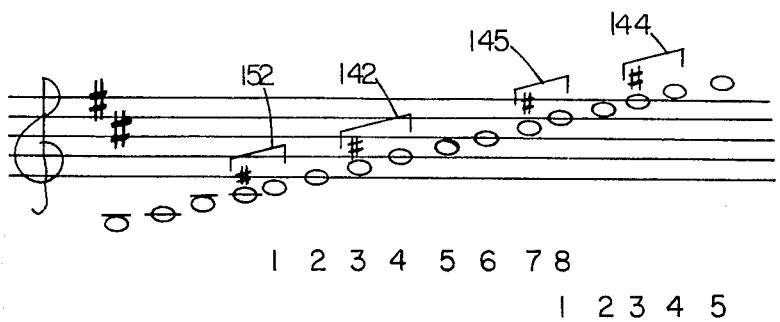
Figure 23:
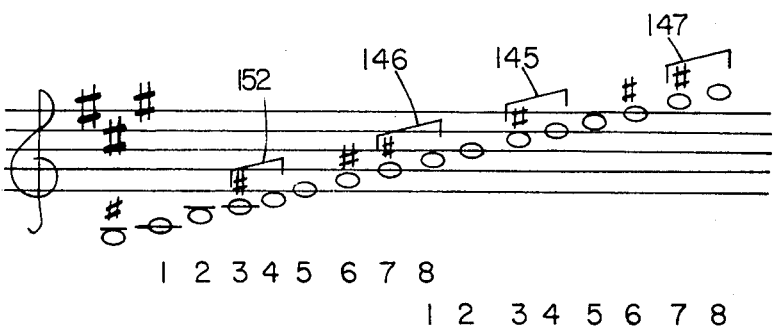
Figure 24:
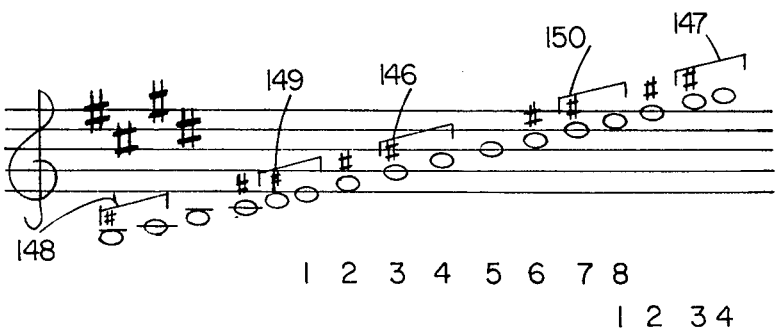
Figure 25:
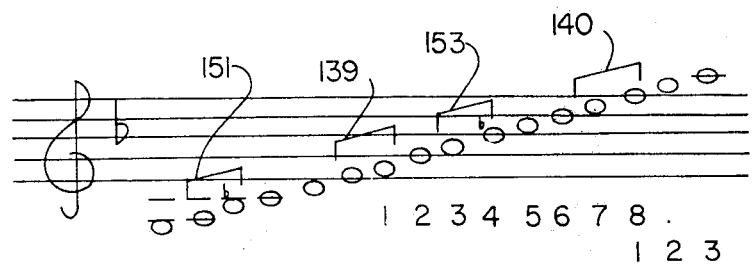
Figure 26:
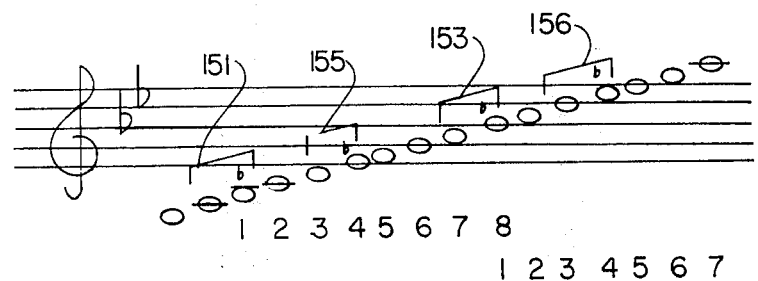
Figure 27:
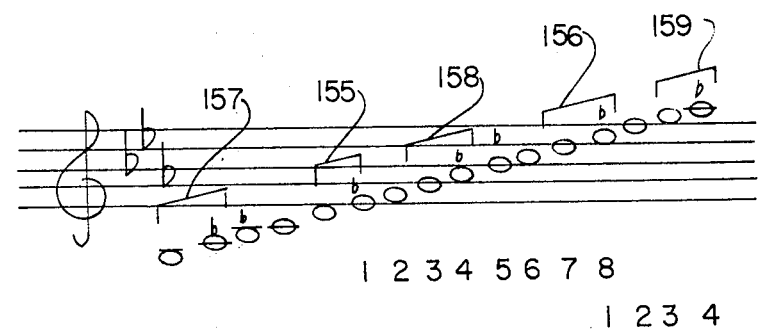
Figure 28:
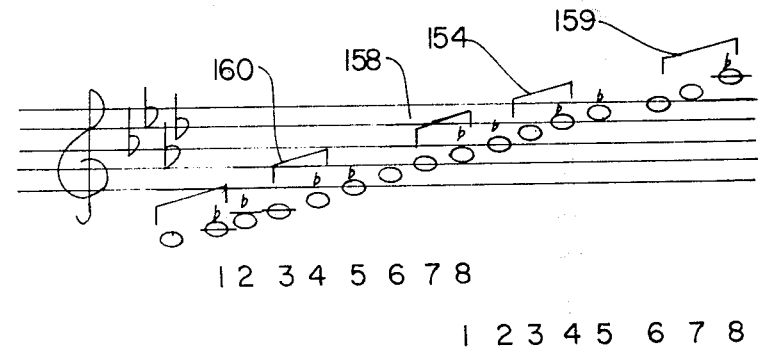

The range of the instrument 41 generally and usually extends from G below middle C (or once-accented C) through middle C and the twice accented C note at the end of the once accented octave ending at the twice accented A note above the twice accented C. Such scale is shown in FIG. 20 while a piano keyboard showing a visual relation of such notes is shown in FIG. 1. As also shown in FIG. 1, notes G-C#, D-G#, A-D#, and E-A#, both on the violin fingerboard 42 and on the simulated fingerboard 40 of apparatus 38 are located on neighboring segments of both of those fingerboards, as segments G-C#, D-G#, A-D#, and E-A# which segments are parallel to each other and in side-by-side relation, while those same notes of the scale are in series on a piano scale as 37 where all of the notes extend along the same straight line.

Figure 9:
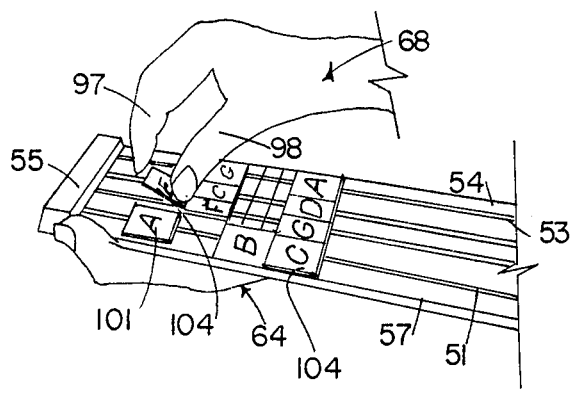
FIG. 9 is a diagrammatic oblique perspective view of a first stage in the movement of a note index unit by a student.
Figure 10:
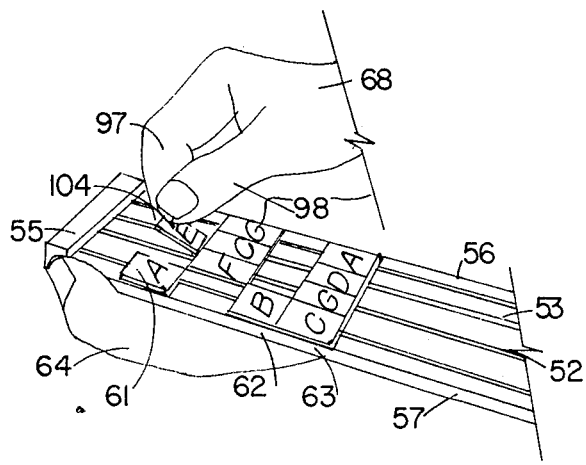
FIG. 10 is a diagrammatic oblique perspective view of a stage in the movement of a note index unit 104 at a stage following that stage shown in FIG. 9.

In operating the apparatus 38, as shown in FIGS. 4, 9 and 10 by a player 74 the player's left hand 64 holds the simulated fingerboard 40 and fingers the note index units to indicate notes played by instrument 41. The note index units may be pressed against the simulated fingerboard by the fingers 65, 66, 67 of the student's left hand 64 to simulate producing a variety of pitches on the stroking of each string as 44–47 on the instrument 41, depending upon the position at which the fingers as 65, 66 and 67 of the student holds such note index units against the fingerboard, while the simulated fingerboard 40 is firmly held, as under the player's chin 75 as shown in FIG. 4 while the player's right hand, 68, may adjust, displace or replace the note index units on the fingerboard 40.

The range of the simulated fingerboard usually extends from G below middle C (or once-accented C) through middle C and the twice-accented C note at the end of the once-accented octave ending at the twice accented A note above the twice-accented C. Such scale is shown in FIG. 20. The first tape, 61, indicates the "high one" position of the first finger 65 (which finger in violin usage is the player's index finger). The second tape 62 shows the position of the player's second finger 66 at its "high two" position. The third tape 63 shows the position of the player's third finger 67.

The tapes 61–63 and the fingerboard area 76 on the surface 56 between the straight edged stripe or tape 61 and fingerboard surface edges 57 and 58 and head 55 and the area 77 between stripe or tapes 61 and 62 and fingerboard edges 57 and 58 and the fingerboard area 78 between tape 62 and 63 and fingerboard edges 57 and 58 define a first series of five positions along the length of each of the wires 51–54.

These tapes 61, 62 and 63 are placed respectively in normal second, fourth, and fifth half step positions of a player. Areas 76–77 show first and third half step positions. Generally there is half a step from the position in area 76 to the position on tape 61, another half step from tape 61 to the position in area 77 and another half step from area 77 position to the position on tape 62. Each successive half step is one half inch further from the molding or head 56 and produces a half step higher pitch than in the preceding playing position. Pressure of the finger on each one-half inch toward the chin 75 of the student as 74 shown in FIG. 4 simulates a half step higher pitch than in the prior position. From tape 61 to tape 62 is a whole step.

In the preferred embodiment of apparatus 40 these tapes are placed with the middle of the first tape one and ½ inch (3.81 cm) from the head 55, the second tape 62 is 3 and ½ inch (8.9 cm) from the head and the third tape 63 is located four and ½ inches (11.43 cm) from the head 55. The first tape represents the number one high position; the second tape represents the second finger high two position, and the third tape 63 represents the third finger or the fifth half step position.

Figure 19:
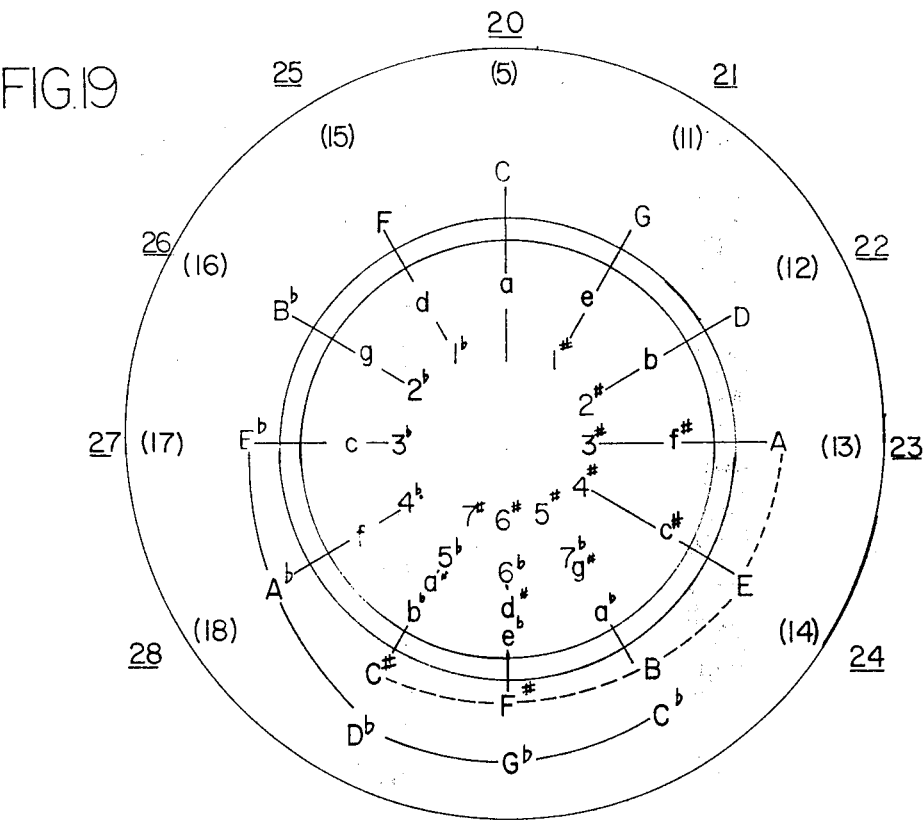

FIGS. 20–28 show the staff notation of pitch showing the equivalent of each line and space at different keys which keys may be played on the violin 41. The finger positions on apparatus 38 for producing such notes are indicated by positions of the note index units in FIGS. 5 and 11–18. The relations of the major keys shown in FIGS. 20–28 to each other and to corresponding minor keys and to other keys and to the finger positions shown in FIGS. 5 and 11–18 are shown in FIG. 19.

With the array of tone index units shown in FIG. 5 the player as 74 presses the center of the top of a unit as 102 or 103 on the fingerboard base 40 to simulate pressing the fingerboard of the instrument 41 at a finger position to produce a note as B or C respectively on the G string of violin 41. Units 102 and 103 are only exemplary as the top surfaces of other tone index unit panels are pressed to similarly simulate finger positions on the fingerboard 42 for other notes. The significant factor in such operation is that when the center of the top surface of the panel of each unit is pressed to simulate and practice playing on the instrument 41 the flat prism bottom surface matches the flat base top surfaces and provides a rigid support for such finger pressure because the contact of the flat surfaces 96 and 56 and the magnetic force between the magnetic prism as 83 and the embedded magnetically permeable steel wire as 51-54 then provides for a stable and firm location of such panel allowing it to be repeatedly used for such practice.

The apparatus 38 also provides that pressing the edge 93 of the panel of a unit as 104 as in FIG. 9 tilts that tone index unit and automatically lifts the other end 94 of the panel above the surface 56 to a position at which it may be readily grasped between the player's fingers 97 and 98 to be thereafter readily positively displaced toward or away from the head 56 of the base 50 or reliably and easily removed from the array of tone index units on the base 50. Such ready grasping and movement of the panel and the entire unit, which are otherwise held by the magnetic force between prisms as 83 and wires as 51-54 in a stable position, is effected even though the neighboring edges, as 91 or 92 of neighboring panels of the neighboring tone index units as 101 and 107 are close to each other during usual operating position thereof as in FIGS. 5, 9, 10 and 15.

The tone index unit panels are of such size as to be close to each other in arrays as in FIGS. 5 and 11 to 18 in order to provide large enough letters to be readily visible to the student using apparatus 38 and also have such a size that they automatically are readily aligned relative to the stripes as 61, 62 and 63 to provide accurate guides to the finger positions on the simulated fingerboard 40 that are conveniently located and accurate representations of the position of the player's fingers on the simulated fingerboard needed for production of the desired notes on the true instrument 41.

Additionally, when the player's finger strike the panel at a location thereon sufficiently removed from the center of the panel as 82 and the magnetic prism therebelow, the unit tilts and indicates to the player the inaccuracy of the finger position applied. Thereafter, the unit as 103 and 104 returns to its position parallel to the surface 56 of the board 50 from which position such unit was tilted after being incorrectly struck. Such return is automatically effected due to the contact of the edge as 86 of the magnet and the wire as 52, which wire is at the surface of the board 56. Accordingly the note index units also serve as indicators of incorrect finger position and by so serving assist the player in correct placement of finger position during finger position practice in a given key.

FIG. 19 shows the major keys in capital letters and the corresponding minor keys are shown in lower case letters. As shown in FIGS. 20-28 however, notwithstanding such apparent complexity, the only change for successive tonics that needs to be made in the finger positions, which positions are illustrated by FIGS. 5 and 11-18, is to move the tone index units so that there is only a one-half step between the third and fourth degree and only a one-half step between the seventh and eighth degree of each scale. Such relation fixes the finger position for any key, and also fixes the changes in finger position for changes in keys. The apparatus 38 thus provides for (1) illustrating those relationships of finger positions and notes in any one and all of a variety of scale as shown in FIGS. 5 and 11-18 and also to (2) readily (a) change the position of the tone index units on the simulated fingerboard and (b) to readily replace the tone index units to illustrate changes in their relations in a manner that is closely related visually and by tactile sense to the finger positions required for producing such variety of finger positions.

The finger positions and the scales of the keys of C major and four flat keys and four sharp keys are illustrated herein (at FIGS. 5 and 11-18). Other flat keys and sharp keys are noted in FIG. 19; the notes used in the scales of those keys are well known and in standard musical texts and the finger positions of the note index units of apparatus 38 for those keys are readily determined from the finger positions such as given for the scales herein set out in FIGS. 5, 11 to 18, and 20 to 28.

To teach finger placement for the key of C major, units 101-112 are placed with the magnet prisms thereof in contact with the wire strings 51-54 as shown in FIG. 5. The scale to be played in the key of C extends from lower or open G for three successively higher notes as A, B and C and then to the pitch corresponding to open D on the scale and then successively to notes E, F and G and then to the open A and then along that string to notes B, C and D then to open E and along that string to F, G and A, as shown in FIG. 20. By removing tone index units 105 and 110 from the positions shown in FIG. 5 and adding units 113 and 114 to the position shown in FIG. 11 the player is apprised of the position of the fingers required for operating in the key of G major. By thereafter removing the units 103 and 108 and adding units 115 and 116 to the positions shown in FIG. 12 the finger positions for the key of D major are shown. By removing units 106 and 111 and adding units 117, 118 and 129 to the positions shown in FIG. 13 the finger positions for the key of A major are shown. By removing the unit 109 from the positions shown in FIG. 13 and adding units 119 and 120 to the positions shown in FIG. 14 the player is apprised of the position of the fingers required for operating in the key of E major.

By removing the units 102 and 107 from position shown in FIG. 5 and adding units 121 and 122 to the positions shown in FIG. 15 the finger positions for the key of F major are shown. By then removing the unit 104 and adding units 123 and 124 in the positions shown in FIG. 16 the finger positions for the key of B flat major are shown. By then removing index units 112 and 101 from their position shown in FIGS. 5 and 16 and adding units 125, 126 and 130 to positions shown in FIG. 17 the player is apprised of the positions of the fingers required for operating in the key of E flat. By then removing the unit 109 and adding units 127 and 128 to the positions shown in FIG. 18 the finger positions for the key of A flat major are shown.

The tone index set 100 comprises a set of tone index units each structurally like unit 104, comprising an upper rigid thin panel as 82 on which an indication of the tone is printed and a lower rigid prism as 83 firmly attached to the bottom of the panel 82. Such lower prisms has such size, thickness, and location as to (a) provide that the unit resists displacement when the panel pressed at a position directly on top of the magnet and thus the unit serves as a practice element for proper finger positioning, and, also, (b) when the top of an edge of the panel is pressed downward toward the surface 56, as in FIG. 9, the unit tilts, as shown in FIG. 8 and the unit then serves as an indicator of inaccurate finger positioning as well as provides for ready grasping of the unit for removing it from board 50 or manipulating it. Although only units 101-130 of set 100 are shown in the figures, the total or entire set 100 comprises 4 tone index units each with a letter from the group consisting of capital letters A, B, C, D, E, F, and G on the top surface, as 81, of a panel as 82 and three tone index units each bearing a capital letter from group of letters A through G with indicia of a sharp thereon, (as on units 114, 116, 118 and 120) and three tone index units each bearing a capital letter from group of letters A through G and also, an indicia of a flat thereon (as on units 122, 124, 126 and 128).

In the preferred embodiment 38 of apparatus above described, each of the tone index units as 104 weighs 2.5 grams. The weight of each magnetic prism as 83 is 2.2 grams and the weight of each panel as 82 (made of cardboard) is 0.3 grams. The magnetic force of each prism as 83 on the wire adjacent thereto in the position as in FIGS. 5, 6, and 11–18 is sufficient to firmly hold the unit as 104 to the wire adjacent thereto, as 52, when the base 50 is turned upside down and is also sufficiently forceful to support twice the weight of the unit 104 from a wire as 51 located in base 50 in an upside down position but such magnetic force is insufficient to support three times the weight of the unit 104 in such upside down position.

The letters on the units as 101–130 of the set 100 are each 1.25 cm. high and vary in width, from 0.5 cm for the letter F to 0.7 cm for the letter G, and the lines from which such letters are made are 0.2 cm thick. The letters such as A through G are located on the panel surfaces as 81 with the height of the letters extending along the length of the panels as shown for the letters on the tone index units 101–130. The half step between the third and fourth degrees and between the seventh and eighth degrees of the scales are shown as 139–160 in FIGS. 20–28, the other notes on those figures being spaced apart by whole steps.

The length of each note index unit as 101–130 substantially equals one half step on the board 50 whereby adjacent note index units indicating finger positions of notes only one half step apart are adjacent to each other as shown for units 102 and 103 in FIGS. 5 and 20 and other units between which, as shown in FIGS. 11–18 and 21–28, there is only a half step while finger positions further than one half step apart, as between units 105 and 106 and between units 108 and 109 and between 110 and 111 in FIG. 5 and other units between which, as shown in FIGS. 20–28, there is a full step, provide a shadow as 135, 136, 137 under the overhang of the rear edge as 93 of each panel as 82 as well as a space between the panels of such units as shown for units 105 and 106 in FIG. 5; such shadows are visible to the player or student 74 and visibly accentuates that there is a space between notes separated by more than one half step.

INDUSTRIAL APPLICABILITY (a) The apparatus 38 serves as a practicing instrument for a student to practice pressing the fingers properly on the simulated keyboard system 38 for proper finger positions in any one of the particular keys chosen as shown in FIGS. 5 and 11–18 and illustrated by conventional visual notation in FIGS. 20–28.

(b) The apparatus 38 provides a guide for locating and maintaining the tone index units in their position for one set of finger positions corresponding to one key until a change of key is made and so allows a student to practice finger positions with the true instrument 41 while observing the simulated fingerboard and the finger position therein.

(c) The apparatus 38 provides for a series of readily visually illustrated changes of finger positions to change the tone index units from the finger positions corresponding to the finger positions for one key to the finger positions for another key.

I claim:

1. A teaching device for stringed musical instruments used by a player thereof to identify, practice and make changes between notes of scales of different keys, comprising a simulated fingerboard and a set of structurally like note index units, the fingerboard comprising a rigid elongated support surface having a length and a width, with magnetically permeable members extending along the length of said surface and said magnetically permeable members are spaced apart from each other along a direction extending across the width of said support surface, said note index units of said set each comprising an upper rigid panel and a lower magnetic element, each said lower magnetic element having a lower surface that matches the upper surface of said support surface and each said upper panel having a greater length than said lower surface and spaced therefrom, said upper surface bearing musical note indicia.

2. Apparatus as in claim 1 comprising also a force between one of said lower magnetically permeable member and one of said magnetic element of each of said note support units exerts a force on said note index unit which exceed the weight of said index unit.

3. Apparatus as in claim 2 wherein said force on said note index unit is less than three times the weight of said note index unit.

4. Apparatus as in claim 2 wherein said upper panel extends beyond the magnetic element at the end and sides thereof.

5. Apparatus as in claim 4 wherein said support surface has a first color and wherein said panel has an upper surface with a second color and the surfaces of said magnetically permeable elements have a third color, and each of said first and second and third colors is different from the other two colors.

6. A process of illustrating correct placement of finger positions on a stringed instrument having an array of strings stretched across a fingerboard, said process comprising the steps of applying and arraying and stably yet removably and tiltably holding at a position on a simulated fingerboard simulating the fingerboard of said instrument each of a plurality of separate and individually movable and removable tone index units, each unit carrying different musical note indicia, said positions located on lines extending along the length of said simulated fingerboard, each of said units being tiltable relative to said simulated fingerboard upon application of pressure near to the edge of said unit, said position of said tone index units on said simulated fingerboard corresponding to finger positions on said instrument fingerboard for each of the notes of a musical scale in a first key, and raising one edge of one of said units from said simulated fingerboard by tilting said one unit when finger pressure is applied to the upper surface of said unit at a position thereon near to the edge of said unit.

7. Process as in claim 6 and including also the step of applying finger pressure to the upper surface of said tone index units to simulate proper finger position on the fingerboard of said instrument for said first key.

8. Process as in claim 6 including also the step of removing said unit from said simulated fingerboard after tilting said unit.

9. Process as in claim 6 comprising also the step of illustrating change in finger position on change in key by adding tone index units to said array of index units on said simulated fingerboard, and removing tone index units from said array to provide a half step between two of said tone index units of said set between the third and fourth degree of said scale in changing from one key to a succeeding key.

10. Process as in claim 6 comprising the step of illustrating change in finger position on change in key by adding tone index units to said array of index units on said simulated fingerboard, and removing tone index units from said array to provide a half step between two of said tone index units of said set between the seventh and eighth degree of said scale in changing from one key to a succeeding key.

* * * * *